US006870899B2

(12) United States Patent
Lu et al.

(10) Patent No.: US 6,870,899 B2
(45) Date of Patent: *Mar. 22, 2005

(54) ADSL LOOP QUALIFICATION SYSTEMS AND METHODS

(75) Inventors: Tingting Lu, Alpharetta, GA (US); Kenneth W. Hartsfield, Birmingham, AL (US); Craig L. Cook, Hoover, AL (US); James Madison Seymour, Alpharetta, GA (US); Phiroz Homi Madon, Old Bridge, NJ (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/265,543

(22) Filed: Oct. 4, 2002

(65) Prior Publication Data

US 2003/0076930 A1 Apr. 24, 2003

Related U.S. Application Data

(63) Continuation of application No. 09/637,050, filed on Aug. 11, 2000.
(60) Provisional application No. 60/148,911, filed on Aug. 13, 1999.

(51) Int. Cl.[7] .......................... H04M 1/24; H04M 3/08; H04M 3/22
(52) U.S. Cl. ................. 379/1.04; 379/15.03; 379/22.04
(58) Field of Search ................ 379/1.03, 1.04, 379/15.03, 22.01–22.04, 22.07, 22.08, 24, 27.01–27.03, 28, 29.09, 30–31, 32.04; 370/241, 244, 248–249

(56) References Cited

U.S. PATENT DOCUMENTS 5,864,602 A 1/1999 Needle 5,978,449 A 11/1999 Needle
6,084,946 A 7/2000 Beierle (List continued on next page.)

FOREIGN PATENT DOCUMENTS

| WO | WO 95/31865 | 11/1995 |
| WO | WO 97/19543 | 5/1997 |

OTHER PUBLICATIONS

Hedlund, E. et al., "DSL Loop Test," *Telephony*, Aug. 24, 1998 (XP02147002).

"ADSL Tutorial—Twisted Pair Access to the Information Highway," http://indy.ids.net/adsl/tutorial.html.

"Extending Asymmetric Digital Subscriber Line (ADSL) Services to Remote Digital Loop Carrier (DLC) Locations," *The International Engineering Consortium*, Web ProForum Tutorials http://www.iecorg., pp. 1–19.

(List continued on next page.)

*Primary Examiner*—Duc Nguyen
(74) *Attorney, Agent, or Firm*—Merchant & Gould

(57) ABSTRACT

Loop qualification systems and methods involve evaluating Loop Make-Up (LMU) data to determine whether loops qualify for certain services, such as ADSL service or other digital services. The LMU data includes such information as whether the loop is comprised of copper, fiber, is a DLC, the length, resist zone, carrier zone, loading factor, the existence of a DAML, and taper code information. The loop qualification systems and methods obtain LMU data on existing loops and also information on loops that have not yet been completed. Network service providers (NSPs) interface with the loop qualification systems to determine whether certain lines are qualified for a service. The loop qualification systems also include web-based interfaces to allow both the NSPs and end users to make an inquiry as to the capability of a given loop.

8 Claims, 16 Drawing Sheets

U.S. PATENT DOCUMENTS 6,091,713 A * 7/2000 Lochleider et al.
6,209,108 B1 * 3/2001 Pett et al.
6,266,395 B1 * 7/2001 Liu et al.
6,292,539 B1 * 9/2001 Eichen et al.
6,343,332 B1   1/2002 Ueda
6,459,702 B1 * 10/2002 Saaverda et al.
6,463,079 B2 * 10/2002 Sundarresan et al.
6,463,126 B1 * 10/2002 Manica et al.

OTHER PUBLICATIONS

"General Introduction to Copper Access Technologies," *ADSL Forum*, 1998 (http//www.adsl.com/general_tutorial.html).

"Making Connection Using ADSL," http://www.epl.co.uk/fastlane.htm, printed Jun. 15, 2000.

* cited by examiner

| | Bellsouth LQS | |
|---|---|---|
| File Utilities Reports Preferences Help | | |

@ BELLSOUTH Loop Qualification

| Telephone | Status |
|---|---|
| 904 443-6022 | A, C |
| 770 677-3333 | N,E3,Loop currently unqualified. Please try again later. |
| 404 869-0033 | A, F |
| 850 432-5907 | P, C, 10/15/1999 |
| | |

Get Status

FIGURE 15(A)

| | Bellsouth LQS | |
|---|---|---|
| File Edit Help | | |

TN/Key [ 7706673224 ]    Get Status

```
N,E3, Loop currently unqualified. Please try again later.
14, Pair Gain loop with no Remote DSLAM.

TN/Key=7706673112
N,E3, Loop currently unqualified. Please try again later.
14, Pair Gain loop with no Remote DSLAM.

TN/Key=7706673114
N,E3, Loop currently unqualified. Please try again later.
14, Pair Gain loop with no Remote DSLAM.

TN/Key=7706673224
N,E3, Loop currently unqualified. Please try again later.
```

FIGURE 15(B)

ADSL LOOP QUALIFICATION SYSTEMS AND METHODS

RELATED APPLICATIONS

This application is a continuation of Ser. No. 09/637,050 filed Aug. 11, 2000.

This application claims priority to, and incorporates by reference, co-pending provisional patent application Serial No. 60/148,911 entitled "ADSL LOOP QUALIFICATION SYSTEMS AND METHODS" filed on Aug. 13, 1999.

FIELD OF THE INVENTION

The present invention relates generally to systems and methods for qualifying lines for a service and, more particularly, tog systems and methods for qualifying lines for digital service, such as Asymmetrical Data Subscriber Line (ADSL) service.

BACKGROUND OF THE INVENTION

The Public Switched Telephone Network (PSTN) is the backbone for providing telephony services to business and individuals in the United States. In addition to telephony, the PSTN is increasingly being relied upon to carry data traffic. In fact, data traffic on the PSTN has become so heavy that it has surpassed the amount of voice traffic. One way in which the PSTN has evolved to meet these demands is to employ Digital Subscriber Lines (DSLs). The DSLs include Integrated Services Digital Network (ISDN) lines and more recently Asymmetrical Digital Subscriber Lines (ADSL). ADSL is in many ways preferred over other DSLs since ADSL does not require the provisioning of any new lines but instead can be executed over a single twisted-wire pair, such as an existing telephone line.

In addition to Plain Old Telephone Services (POTS), an ADSL system also permits full-duplex and simplex digital services with data rates from about 1.5 Mbits/second to 7 Mbits/second. An ADSL system uses a spectrum from about 26 kHz to 1.1 MHz for broadband data transmission and leaves the spectrum from about DC to 4 kHz for POTS. An ADSL system is more than capable of providing video-on-demand capability, video conferencing, data file transfer capability and can provide all of this capability simultaneously with POTS. For additional information, reference may be made to American National Standards Institute Standard ANSI-T1.413-1995 which describes an ADSL system and an interface between a telecommunications network and a customer's installation and which is incorporated herein by this reference.

While ADSL can be executed over existing telephone lines, not all telephone lines are capable of carrying ADSL traffic. Consequently, when a customer orders ADSL service, a technician is typically dispatched to the location to test the line. One way in which a technician tests the line is by trying to establish communications between an ADSL transceiver located at the customer's premises with an ADSL transceiver located at a central office. If the ADSL transceivers are able to communicate with each other to a satisfactory degree, then the ADSL services may be deployed at the customer's premises.

The need to dispatch a technician to the customer's premises before deploying ADSL services is a great inconvenience and has a high cost. The need to test the line places a great burden on the technicians who must be dispatched to the customer's premises. For areas that may have thousands if not millions of potential ADSL customers, using technicians to test the line at each customer's premises is impractical. In addition to the enormous cost associated with the technicians, the need for an ADSL transceiver at the customer's premises also presents a substantial expense. This expense is often incurred by the customer before the customer even knows if ADSL are available. Even if the cost of the ADSL transceivers are absorbed by the service provider, the transceivers still require an outlay of capital before ADSL services can be deployed.

Other methods of qualifying lines for digital services involve testing that occurs at the central office. U.S. Pat. Nos. 5,864,602, 5,978,449, and 6,084,946, which are incorporated herein by reference, describe various ways of qualifying lines for digital service. These methods generally involve applying an AC test signal and then measuring a tip-to-ring capacitance of a wire pair. Some of the methods described in these patents involve additional measurements, such as measuring a second impedance of the wire pair at another frequency. Based on these measurements, the line is qualified to receive digital services if the measurements are within prescribed limits. While these methods avoid the need to dispatch a technician to the customer's premises, these methods still require testing to occur at the central office for each line.

The testing of lines to qualify them for new services is further complicated in that more than one company may provide the digital services over any given line. Whereas the incumbent local exchange carrier (LEC) would traditionally provide all local services to the lines within its region, the opening up of the local loops to competition now makes it possible for competitive local exchange carriers (CLEC) to not only offer local telephony service but also to offer peripheral services, such as digital services. Providing all of these companies access to all of the lines in order to test them for potential serve is impractical.

A need therefore exists for improved systems and methods for qualifying loops for ADSL services.

SUMMARY OF THE INVENTION

The present invention addresses the problems described above by providing systems and methods for qualifying lines for services. The systems and methods involve obtaining data on the characteristics of the lines. Preferably, this data is obtained from data gathered during engineering of the lines and/or from a database containing an inventory of the lines. The systems and methods receive requests as to the status of lines for digital services and, in response to these requests, evaluates the data on the line characteristics. The systems and methods reply to the requests by providing the status of the lines, such as whether the lines are capable of receiving certain services. The systems and methods are preferably used in the qualifying of lines for Asymmetrical Digital Subscriber Lines (ADSL), although it may be used for other types of services.

The preferred systems and methods involve evaluating Loop Make-Up (LMU) information and, based on this evaluation, determining whether the loops qualify for enhanced digital services, such as ADSL. The systems and methods are preferably capable of evaluating loops having different configurations, such as copper, fiber, and DLC, and of eliminating those loops that would not qualify for the service. By disqualifying certain loops, the number of loops that a technician must be dispatched to can be drastically reduced, thereby resulting in a considerable savings to the service provider. The invention also preferably is able to identify loops that will be capable of carrying services in the future and of qualifying lines that have not yet been completed.

In the preferred embodiment, the loop qualification system is employed by a Local Exchange Carrier (LEC) and interfaces with network service providers for the digital services. The network service provider (NSP) can interface with the loop qualification system in a variety of ways, such as through e-mail or through a CORBA interface. In addition to front-end interfaces with the NSPs, the loop qualification system has back-end interfaces for receiving LMU data from other systems, such as a Loop Engineering Inventory System (LEIS) and network deployment information from a network planning organization. Preferably, the NSP has a Graphical User Interface (GUI) through which information identifying lines may be inserted. This information on the lines is forwarded to the loop qualification system which then performs its analysis on the lines and returns the results to the NSP. This GUI may be accessible not only to the NSP but also through its customers or potential customers, such as through the Internet. The NSP preferably has a multi-threaded interface with the loop qualification system. A multiplexor within the NSP provides a virtual real-time connection with the loop qualification system. In addition to the GUI and also the multiplexor, NSPs preferably also have the ability to send inquiries on lines in a batch-mode to the loop qualification system.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings:

FIGS. 15(A) and 15(B) are screen shots of client-side Graphical User Interfaces for submitting telephone numbers or addresses for qualification to the loop qualification system.

DETAILED DESCRIPTION

Reference will now be made in detail to preferred embodiments of the invention, non-limiting examples of which are illustrated in the accompanying drawings.

Figure 1:
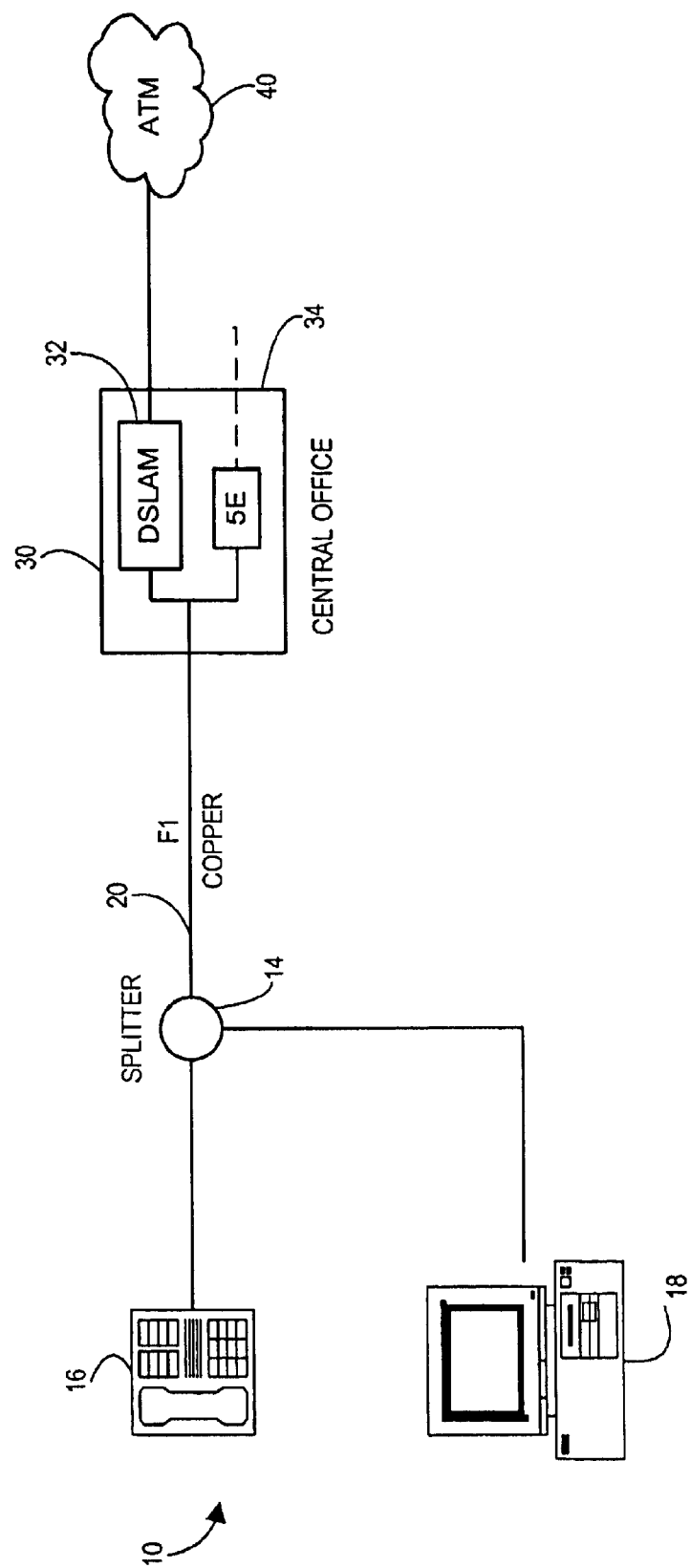
FIG. 1 is a block diagram of a local loop according to a first configuration.

ADSL services may be deployed at a customer's premises in a variety of different ways. FIG. 1 illustrates one manner in which ADSL services are provided over an existing twisted-paid copper wire. According to this configuration, the customer's premises 10 include a splitter 14 for directing the POTS signals to POTS devices 16, such as a conventional telephone, for directing ADSL signals to an ADSL device 18, such as a computer with an ADSL transceiver, and for directing the combined POTS signals and ADSL signals over a telephone line 20 to a central office 30. The central office 30 includes a Digital Subscriber Line Access Multiplexor (DSLAM) 32 and a switch 34, such as a 5E switch. The DSLAM 32 facilitates the transmission of ADSL data traffic between the customer's premises equipment and a Wide Area Network (WAN) 40, such as an Asynchronous Transfer Mode (ATM) network. The switch 34 within the central office 30 provides the connection to the remaining portion of the PSTN.

Figure 2:
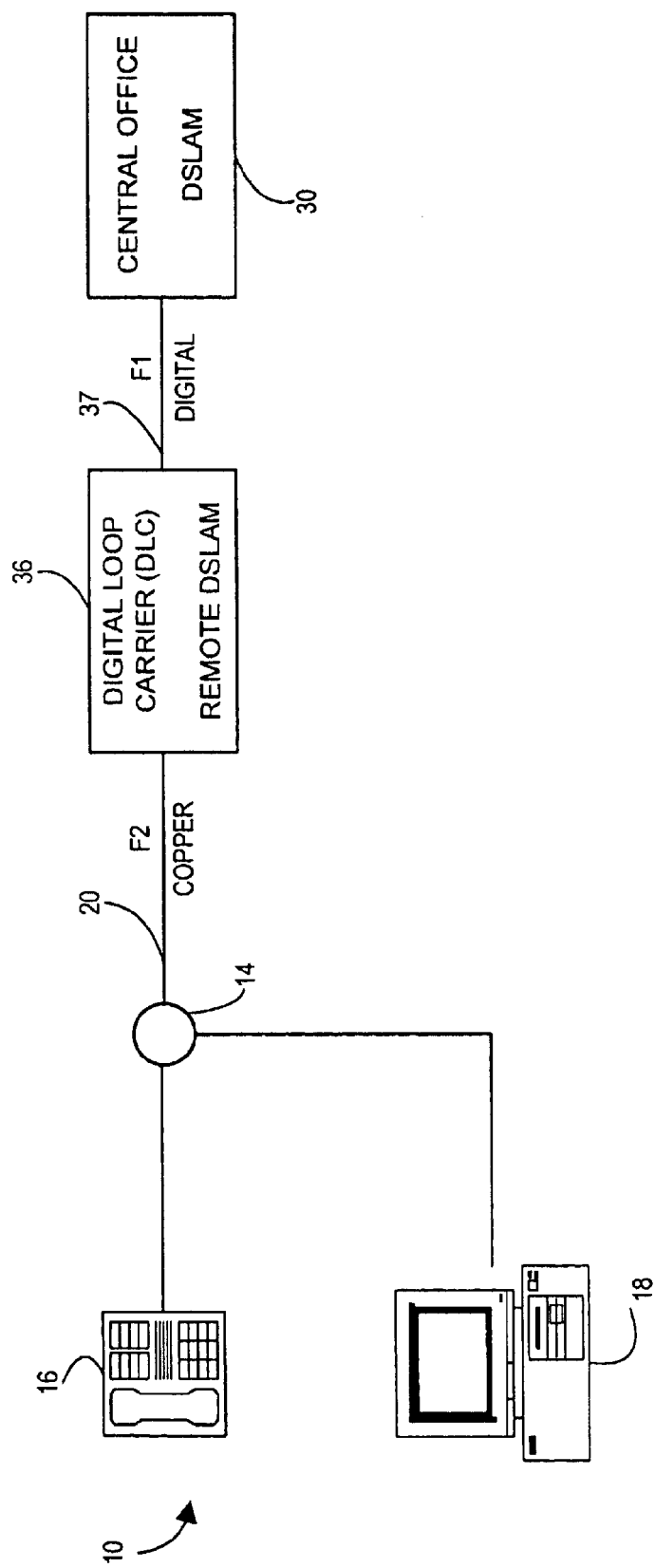
FIG. 2 is a block diagram of a local loop according to a second configuration.

Another possible configuration in which a customer may receive ADSL services is shown in FIG. 2. According to this configuration, the customer's premises 10 still include a splitter 14 for separating the POTS signals from the ADSL signals but differs from the configuration in FIG. 1 in that it includes a remote DSLAM 36. A remote DSLAM 36 is desirable when serving large number of ADSL customers. The remote DSLAM 36 is associated with a Digital Loop Carrier (DLC) 37 whereby the remote DSLAM 36 is coupled to the central office 30 via a digital line 37.

Figure 3:
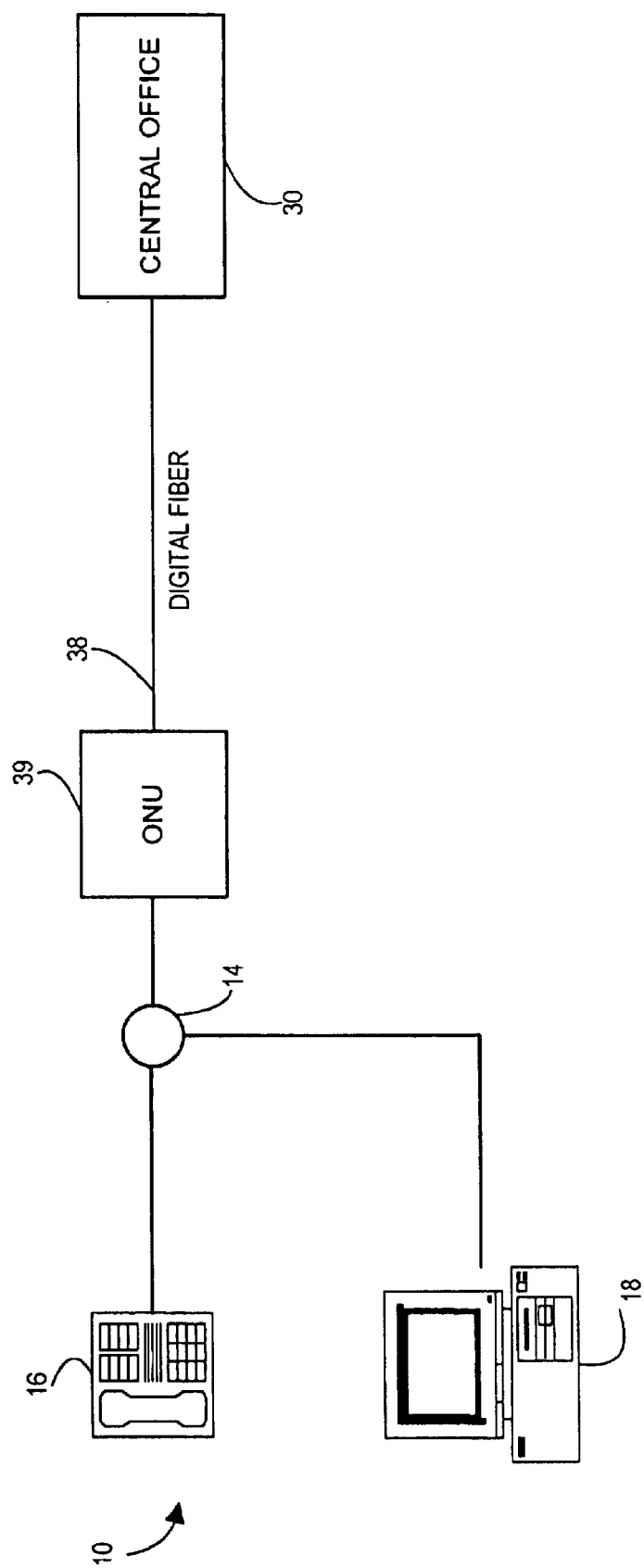
FIG. 3 is a block diagram of a local loop according to a third configuration.

A third possible configuration for providing ADSL services to a customer's premises 10 is shown in FIG. 3. In this example, a digital fiber 38 extends between the central office 30 and an optical network unit (ONU) 39. The ONU 39 is located relatively close to the customer's premises 10 and provides the necessary conversions between electrical signals and optical signals.

The invention, according to preferred embodiments, is directed to systems and methods for qualifying loops for enhanced services, such as ADSL services and other digital services. The loop qualification system evaluates the ability of a loop to receive the enhanced service and eliminates the need to dispatch a technician to every customer's premises. The loop qualification system is able to disqualify loops that are determined not to be capable of receiving the enhanced service and, by the process of elimination, is consequently able to identify a set of loops that are potential candidates for the enhanced service. The loop qualification system is preferably conservative in its evaluation in that this set of potential loops contains loops that known to be capable of receiving ADSL services as well as some loops that possibly may not be capable of receiving the enhanced service. The loop qualification system therefore substantially reduces the number of loops that may require testing by a technician.

In addition to not requiring the dispatching of a technician, the systems and methods of the invention do not require any measuring of line impedances at the central office. Whereas conventional techniques for qualifying lines relied upon measuring the impedance at one or more frequencies, the invention provides a less burdensome approach by eliminating the need to do any central office measuring or testing. The methods and systems of the invention are consequently also less burdensome on the customers. The conventional techniques for qualifying lines involve disconnecting the lines from the central office prior to measuring the impedance on the lines. The need to disconnect the lines can translate into a reduction in the quality of service (QoS) provided to the customers. Because the systems and methods of the invention do not require the lines to be disconnected from the central office, the invention provides a more customer friendly and higher QoS approach to qualifying lines.

The loop qualification system performs its evaluation of a loop based on data that refers to the characteristics of the lines. For a regional Bell operating company (RBOC), this Loop Make-Up (LMU) data includes data specifying the line as copper, fiber, DLC, length, resist zone, count zone, loading factor, and DAML. This LMU data includes the type of line, length of line, impedance of line, and anything else that directly or indirectly refers to the features, aspects, parameters, or quality of the lines. By evaluating this LMU data, the loop qualification system eliminates those loops that are not qualified for enhanced services and identifies potentially capable loops.

The methods and systems according to the invention may be provided by a provider of the ADSL services or by the provider of other services, such as a Local Exchange Carrier (LEC). The LMU data need not be centrally located but may be dispersed to a plurality of locations. Many of the RBOCs rely upon a Loop Facility Assignment Control System (LFACS) for maintaining data on the inventory and assignment of loops. The loop qualification system may therefore obtain LMU data from the LFACS in making its evaluation of the loops.

Figure 4:
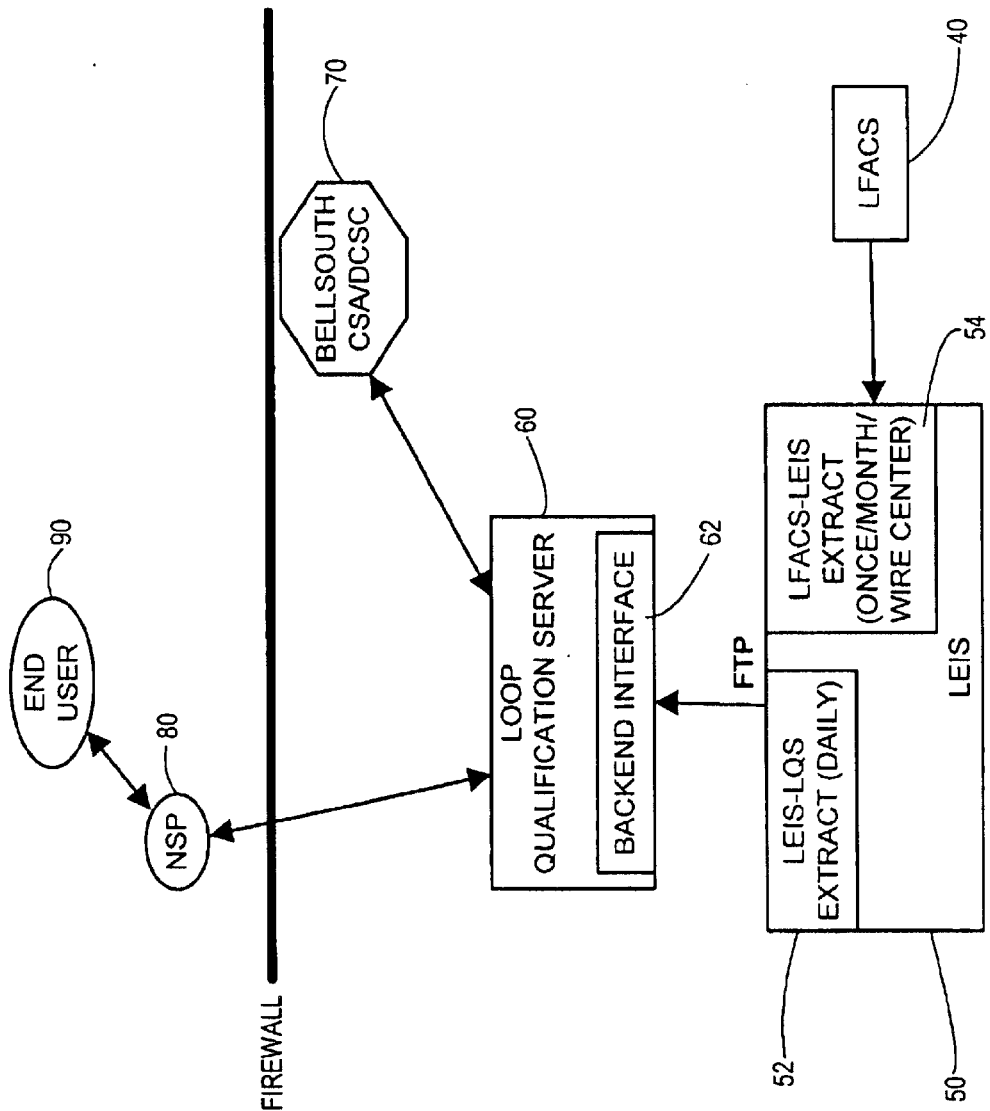
FIG. 4 is a block diagram of a loop qualification system according to a first aspect of the invention.
Figure 5:
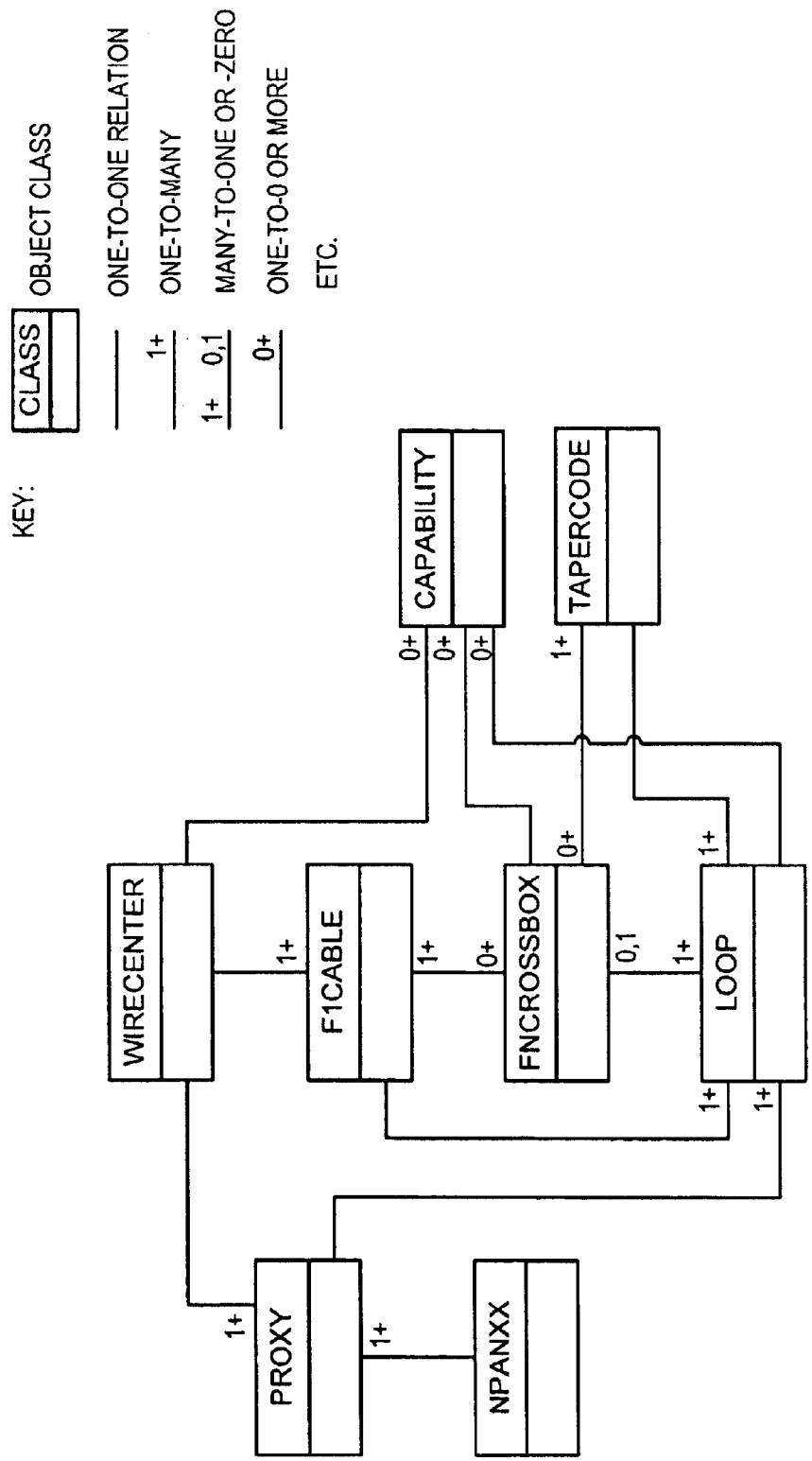
FIG. 5 is a data model for the loop qualification system shown in FIG. 4.

The invention is not limited in the manner in which LMU data is acquired. FIG. 4 illustrates an example of a network for providing data from LFACS 40 to a loop qualification server 60, and FIG. 5 illustrates a data model of a loop qualification database. LFACS 40 is a legacy system for assigning loop facility in real-time during service activation process and has LMU data for all assigned loops. Rather than interfacing directly from the loop qualification server 60 to LFACS 40, which may have performance impact on the real-time service activation process through LFACS 40, the loop qualification server 60 receives data from a Loop Engineering Inventory System (LEIS) 50. As shown in FIG. 4, the loop qualification server 60 includes a backend interface 62 for receiving data from the LEIS 50. The LEIS 50, in turn, includes an interface 52 to the loop qualification server 60 and also an interface 54 to LFACS 40. The loop qualification server 60 preferably receives the data from LEIS 50 via File Transfer Protocol (FTP) and maintains a separate database at the loop qualification server 60 for storing the LML data. The loop qualification server 60 receives network deployment information from a network planning organization and has an interface to the Customer Service Associates (CSA) located at the Data Customer Service Center (DCSC) 70 supporting the ADSL servicing process.

On a daily basis the loop qualification server 60 polls an inbox to see if new files have arrived via FTP from LEIS 50. For each file in the inbox, the loop qualification server 60 processes the file and updates the database. The loop qualification server 60 determines whether a loop is qualified by evaluating the LMU data using a variety of criteria. For instance, if the loop is a foreign exchange line, the loop is loaded, has DAML, or has a Resist Zone (RZ) greater than 13, then the loop qualification server 60 determines that the loop is not qualified for ADSL. The above-mentioned criteria is suitable for eliminating loops having a configuration similar to that shown in FIG. 1. For configurations similar to that shown in FIG. 2, the loop qualification server 60 preferably also considers a terminal Carrier Zone (CZ). A loop is disqualified if the terminal CZ value is greater than 9. For the configuration shown in FIG. 3, the loop qualification server 60 determines that the loop is qualified if it is associated with an ONU 39.

The invention is not limited to these methods or manners of disqualifying loops. As will be appreciated by those skilled in the art, other LMU data may be considered when determining whether a loop is qualified for a certain service. Further, more sophisticated analyses may be developed to assist in the evaluation of loops. The reliance on other LMU data and the use of other methods of analyses is intended to be encompassed by the invention.

For instance, the loop qualification server 60 may also evaluate loops based on their taper code. The loops are organized into tapers with many tapers located within a wire center. If one loop within a taper is determined to not be capable of receiving ADSL services, then the other loops within that same taper will likely also not be able to accommodate ADSL services. This information on taper codes is preferably received from the network maintenance group when diagnosis was performed on a particular taper code.

The loop qualification system 60 may provide additional information other than whether a loop qualifies for ADSL service. For instance, the loop qualification system 60 can provide information on a projected speed a loop can support. The loop qualification system 60 may employ algorithms for deriving the projected speed based on LMU data or, alternatively, another system may derive the projected speed and populate LFACS 40 with this information. If the speed band information is placed in LFACS 40, the loop qualification system 60 retrieves this information indirectly from LEIS 50. The projected speed can therefore automatically be delivered for every loop qualification inquiry. The projected speed is significant since different levels of ADSL service is being offered with these different levels varying in both upstream and downstream speeds. By delivering the projected speed capability of a loop, the maximum level or class of ADSL can be inferred and may be communicated to the end user 90 or NSP 80.

Figure 6:
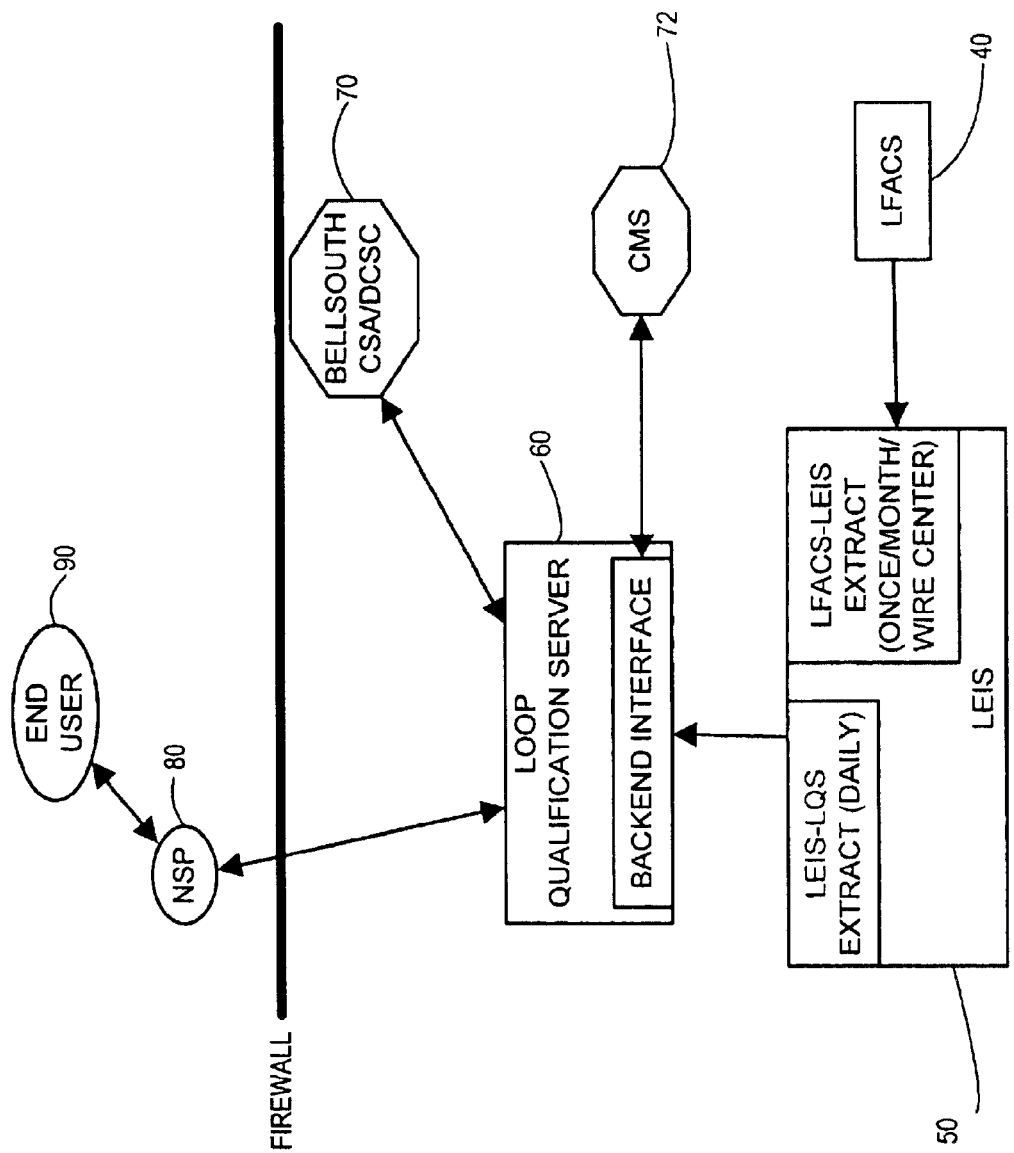
FIG. 6 is a block diagram of a loop qualification system according to a second aspect of the invention.
Figure 7:
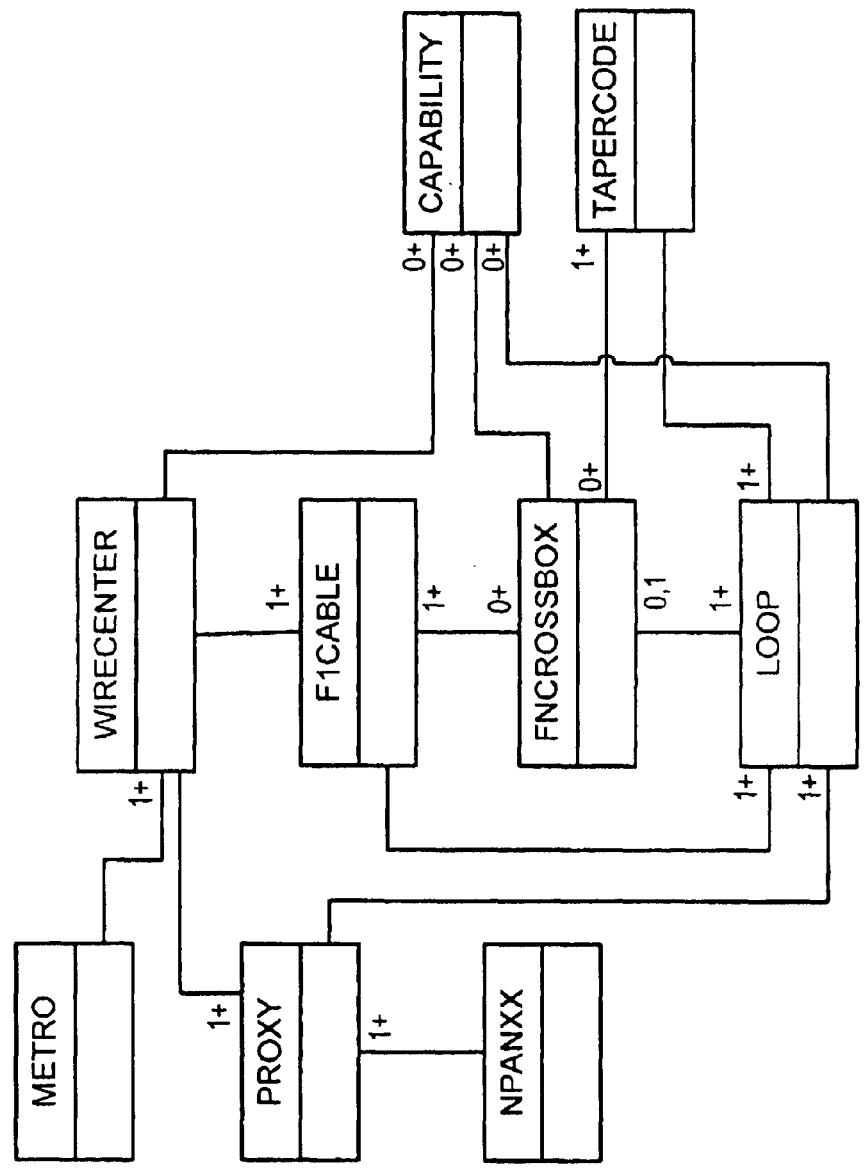
FIG. 7 is a data model for the loop qualification system shown in FIG. 6.

As described above, the loop qualification system 60 is used to evaluate whether existing loops are capable of receiving ADSL services. The loop qualification systems and methods according to the invention may also be used to provide information on not yet completed loops. FIG. 6 provides an example of a network in which the LEIS 50 receives information on planned loops from Consumer Multimedia Services (CMS) 72. The CMS 72 provides a file having information on planned dates for when certain loops will provide data service via fiber. The loop qualification system 60 may therefore be used in a proactive manner by notifying NSPs 80 or end users 90 of when ADSL service may become available. FIG. 7 illustrates a data model for the loop qualification server database shown in FIG. 6.

As discussed above, the loop qualification system 60 can qualify an assigned loop or a yet-to-be assigned loop based on telephone number. The loop qualification system 60 preferably also qualifies loops that do not have an assigned telephone number. According to this aspect, the request, such as from an end user 90, for ADSL service is made at the same time when a request is made for a POTS line. The loop qualification system 60 ascertains the availability of ADSL without relying on the telephone number but instead by such information as the address. The loop qualification system 60 determines whether potential loops for that address qualify for ADSL service and reserves a particular loop. If the potential loops do not qualify for ADSL service, then the loop qualification system 60 identifies other candidates and reserves a line that is capable of supporting ADSL. The loop qualification system 60 performs its inquiry without an assigned telephone in a variety of ways all of which are intended to be encompassed by the invention. For instance, the loop qualification system 60 uses address information to obtain a Wire Center/Taper Code or a serving terminal.

Figure 8:
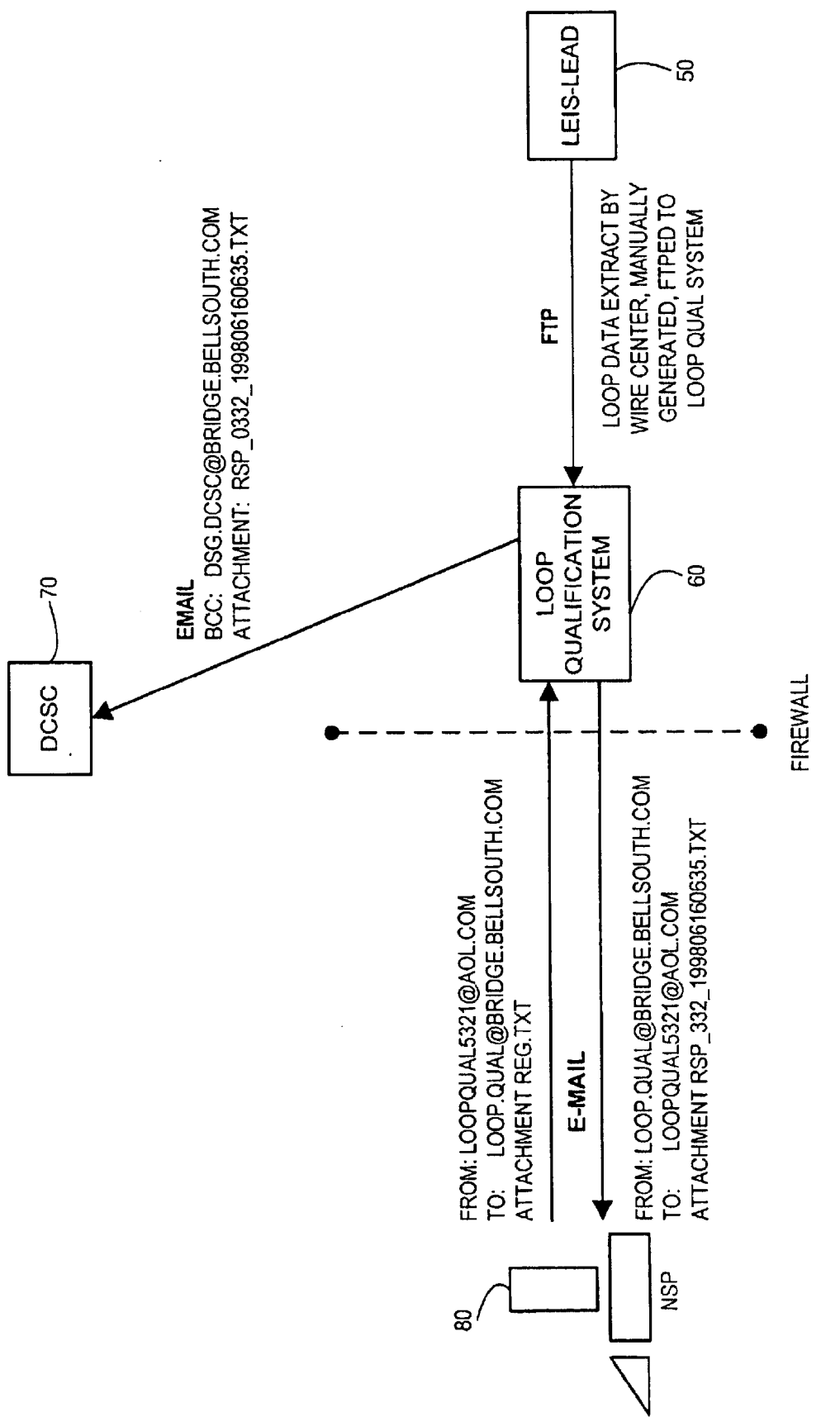
FIG. 8 is a first example of a communication flow diagram for a loop qualification system.
Figure 9:
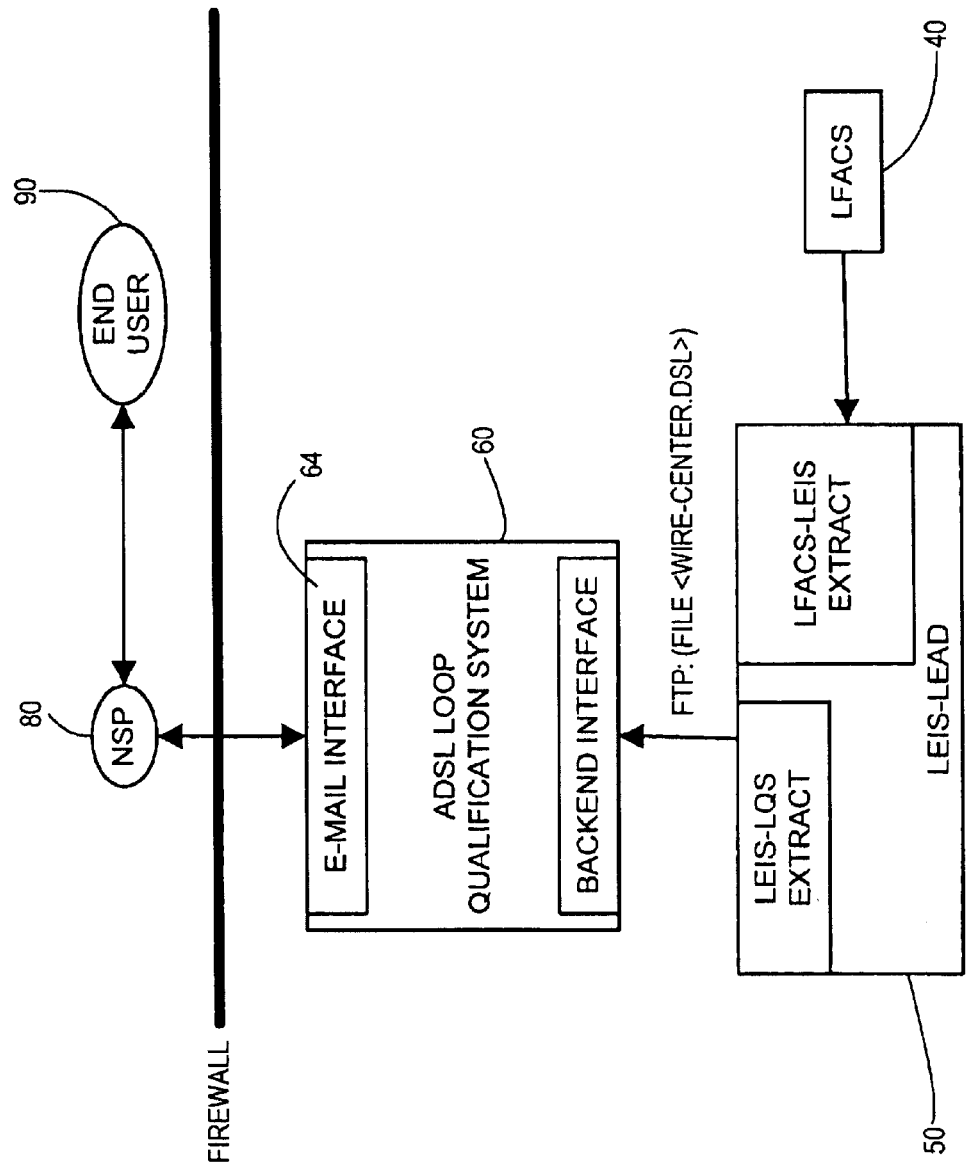
FIG. 9 is a block diagram of a loop qualification system illustrating a first set of interfaces to end users and to LFACS.

The loop qualification system 60 may interface with other systems, service providers, or other entities, such as end users 90, in any suitable manner. FIG. 8 illustrates one example of how the loop qualification system 60 may interface with other systems. As discussed above, the loop qualification system 60 receives LMU data from the LEIS 50 through FTP. The loop qualification system 60 also has e-mail interfaces 64 with the NSPs 80 and with the DCSC 70. Through these interfaces 64, the NSPs 80 provide the loop qualification system 60 with inquiries as to whether certain telephone numbers quality for ADSL service. The loop qualification system 60 receives these e-mails, processes the requests, and sends e-mail replies to the NSPs 80 with answers to the inquiries. The information on whether certain loops qualify for ADSL service is also desired by CSAs located at the DCSC 70. With reference to FIG. 9, an end user 90 can interface with the NSP 80 to determine whether the NSP 80 is able to offer ADSL service. The NSP 80, in turn, interfaces with the loop qualification system 60 via e-mail and relays the answer from the loop qualification system 60 to the end user 90. As will be appreciated by those skilled in the art, a single NSP 80 may need to interface with a plurality of LECs and, similarly, a single loop qualification system 60 may need to interface with a plurality of NSPs 80.

Figure 10:
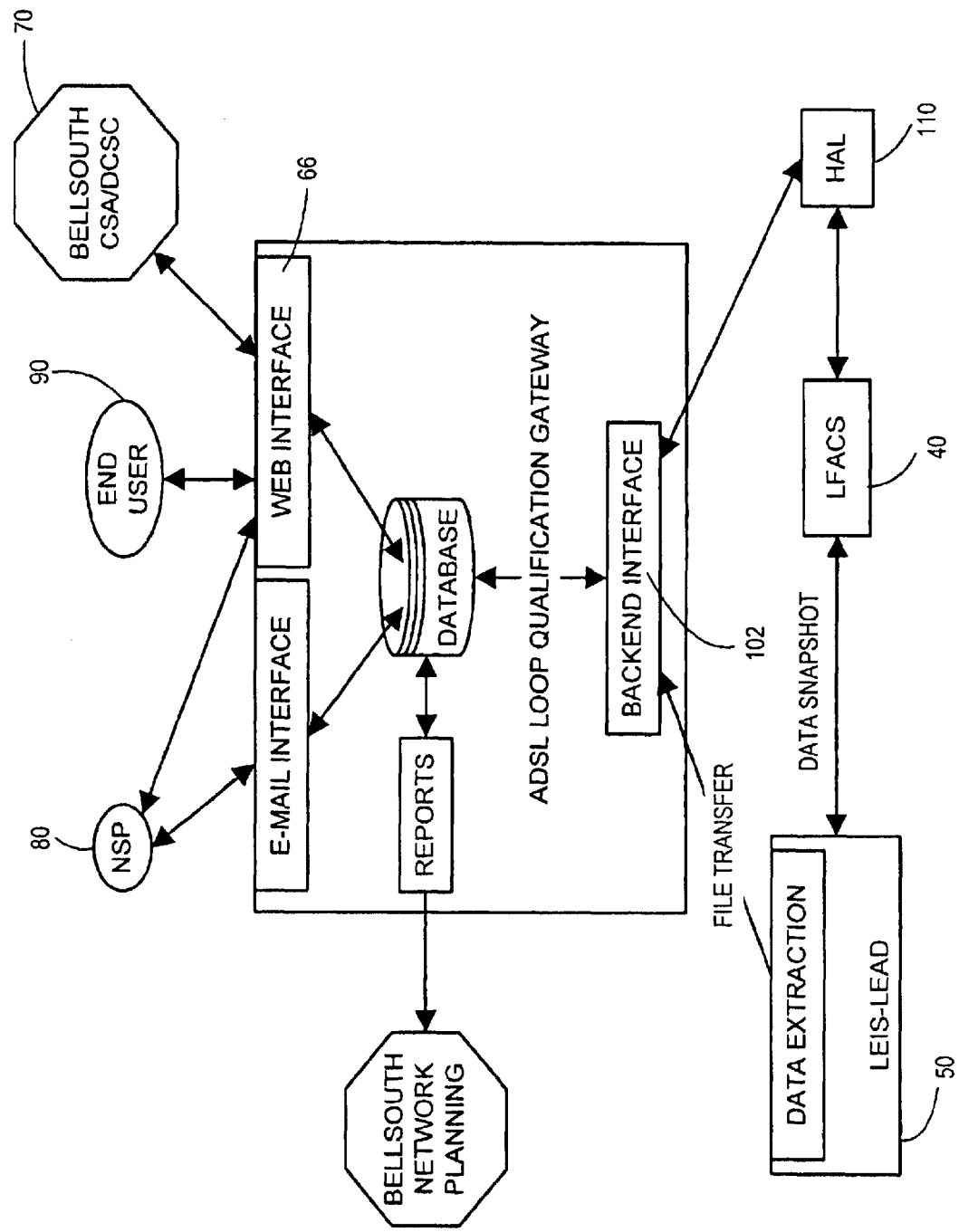
FIG. 10 is a block diagram of a loop qualification system illustrating a second set of interfaces to end users and to LFACS.

A loop qualification system 100 according to a further aspect of the invention is shown in FIG. 10. The reliance on e-mail to communicate loop qualification information has several limitations. For one, the e-mail interface 64 does not provide real-time information. The NSP 80 or end user 90 may want to know immediately whether a certain loop is qualified for ADSL service. For instance, a customer 90 may call the DCSC 70 and the DCSC 70 would desire an immediate response to the customer's inquiry. The loop qualification system 100 shown in FIG. 10 maintains the e-mail interface 64 with the NSP 80 but also includes another interface 66. This second interface 66 allows the NSP 80, end user 90, and DCSC 70 to interface with the loop qualification system 100 on a real-time basis.

The loop qualification system 100 shown in FIG. 10 also includes a backend interface 102 to LFACS through Hands Off Assignment Logic (HAL) 110. The LFAC-LEIS extract occurs on a daily basis on a rotating basis for the lines and complete an update of all lines once per month per wire center. Consequently, a loop qualification database 104 is potentially one month out-of-date for a given wire center. The loop qualification information on new numbers that have been activated within the last 30 days will potentially not be present in the loop qualification database 104. According to the embodiment shown in FIG. 10, HAL 110 receives a file with these new numbers each day and sends the file via FTP to the loop qualification system 100.

Figure 11:
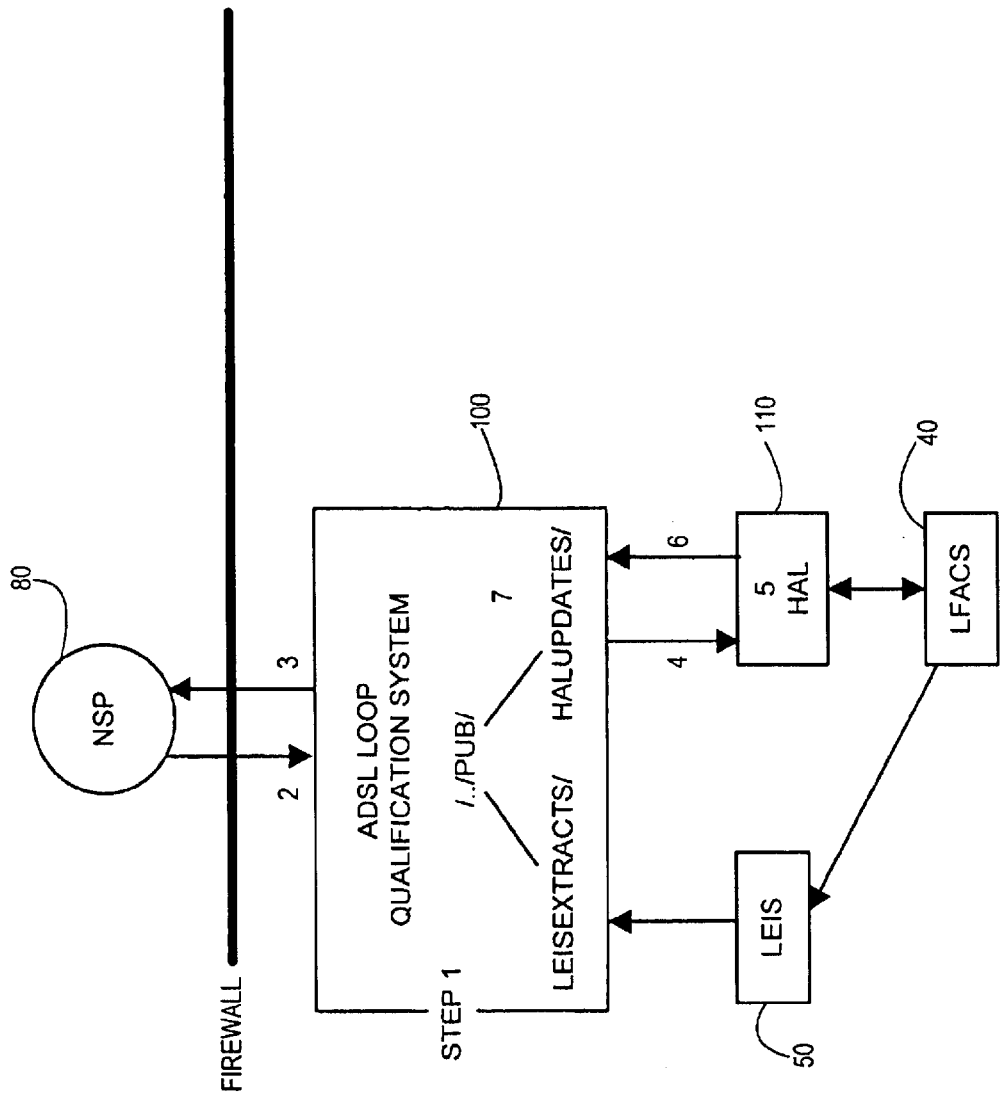
FIG. 11 is a second example of a communication flow diagram for a loop qualification system.

FIG. 11 illustrates a flow diagram for the processing of these new numbers. Each day, the NSPs 80 send the loop qualification system 100 e-mails with phone number files to qualify and the loop qualification system 100 responds with the loop qualification status for each of those numbers. At the first occurrence of a recent number, the loop qualification system 100 creates a file containing all of the recent numbers encountered during that day. The loop qualification system 100 responds to the NSP 80 by providing the NSP 80 with a file in which recent numbers are marked with a status undetermined. The loop qualification system 100 also informs the NSP 80 to re-submit the number at a later time, such as after 24 hours. Subsequently, such as the next day, the loop qualification system 100 examines the existence of a recent-number file for the previous day. If the file exists the loop qualification system 100 sends this file via FTP to HAL 110 and, if the file does not exist, no action will occur. For each new telephone number, HAL 110 generates a response file and places this file into a HAL update directory within database 104 in the loop qualification system 100. The loop qualification system 100 polls this directory on a periodic basis and, when the file is found, processes the response file by updating the loop qualification database 104.

Figure 12:
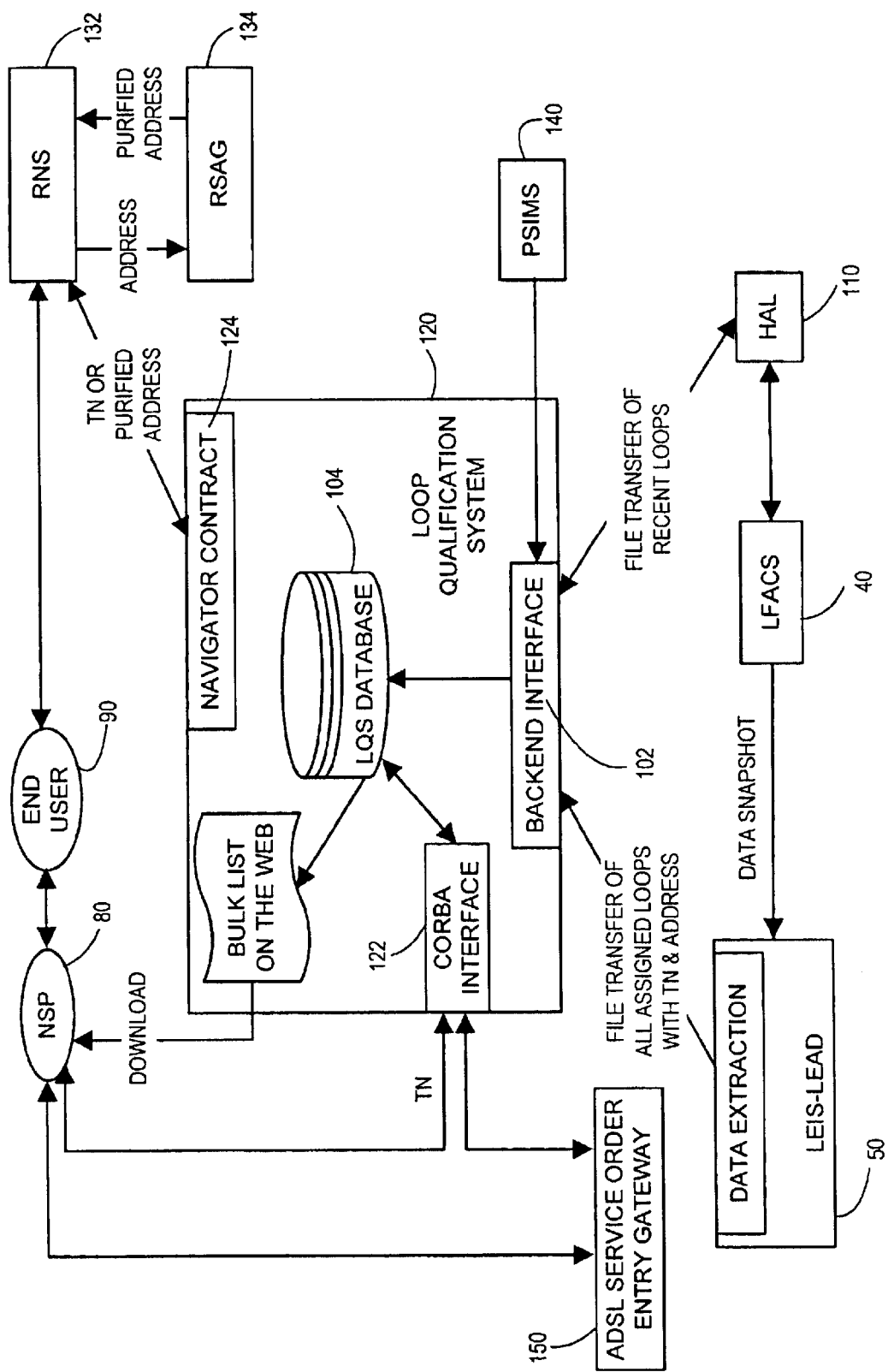
FIG. 12 is a block diagram of a loop qualification system according to a third embodiment of the invention.

A network according to a third embodiment of the invention is shown in FIG. 12. The network includes a loop qualification system 120 having a loop qualification system database 104. The loop qualification system 120 has the back end interface 102 for interfacing with LEIS-LEAD 50 and HAL 110. As described above, LEIS-LEAD 50 contains a data snapshot of all the loops and all LMU data contained within LFACS 40 and is updated a monthly basis. The loop qualification system 120 receives LMIU data on recent loops through HAL 110. The loop qualification system 120 also has a Navigator Contract interface 124 to a Regional Negotiation System (RNS) 132. The RNS 132 includes a Regional Ordering System (ROS) which together with RNS are responsible for receiving and marketing orders for digital services. The loop qualification system 120 also includes a CORBA interface 122 to the NSPs 80 and to an ADSL service order entry gateway 150. The CORBA interface 122 can display more or less detail as a function of the user ID. More detail can also be provided without requiring any upgrades at the NSPs 80 or gateway 150.

For loop qualification requests that originate from RNS 132, the consumer service representative inputs the customer's address into RNS 132. The RNS 132 validates the address through an interface with RSAG 134 which returns a purified street address, wire center name, and working/non-working lines in the location. The RNS 132 provides the loop qualification system 120 with the wire center, street address, and working phone numbers, if available, through the Navigator Contract interface 124. The loop qualification system 120 responds to this request by evaluating the data in the loop qualification system database 104. If the request includes an address, the system 120 qualifies all loops in a living unit regardless of whether they have an assigned telephone number. If the RNS 132 sends telephone numbers in the request, the system 120 qualifies the telephone numbers without regard to the living unit. If the loops are not qualified for service, the loop qualification system 120 returns a message "no qualified loops." The loop qualification system 120 is preferably also to perform loop qualification on non-working loops which may not presently have a phone number. The loop qualification system 120 can qualify such loops through a query by wire center and living unit ID (LU ID). For external queries, the system 120 takes requests that contain addresses and translates them into queries based on living unit.

The loop qualification system database 104 contains a number of files. The database 104 is updated automatically from a variety of sources, such as LFACS 40 and LEIS-LEAD 50 through LEIS 50, LFACS data through HAL 110, and NPA-NXX-related files through PSIMS 140. For instance, the loop qualification system database 104 includes a wirecenter.lop file containing a network topology view pertaining to loop qualification for a given wire center. This file provides information on cross-boxes, F1 cables, and FN cables and loops related to a given wire center. A wirecenter.lu file contains the living unit records in LEIS 50 for a given wire center with each record containing the loop-ID field whereby the living unit may be related to a working, connect-through, or PC-data loop. An NPANXX.map file provides the relation between each wire center and the home NPA-NXX for that wire center and is sent automatically from LEIS-LEAD 50 to the loop qualification system 120 whenever a wirecenter-to-NPANXX mapping is updated. A npa.spl file provides the mapping in the event of an NPA-NXX split and a number pooling file provides the wire center to NPA-NXX mapping. An ADSLWC.pri file provides information on wire centers that are ADSL DSLAM-equipped and provides the taper distance limit for each wire center. An ADSLXBOX.rem file provides information on cross-boxes associated with wire centers that are remote DSLAM-equipped and a date.csv file provides information on planned dates for when certain loops will provide PC-data service. This file is generated by CMS 72 and is sent whenever planned PC-data service information is updated. Preferably, this file also specifies the wire center and living unit ID for each living unit in place of phone number. An ADSLWC.tpr file provides information necessary for the additional loop qualification conditions that are dependent on taper codes. This file is generated in LEIS 50 and sent to the loop qualification system 120 via FTP whenever the taper code-related information is updated. The loop qualification system database 104 also includes date_1.rsp and date_2.rsp files generated by HAL 110 and sent to the loop qualification system 120 via FTP. These files provide the loop qualification system 120 with data on specific recent loops.

Figure 13:
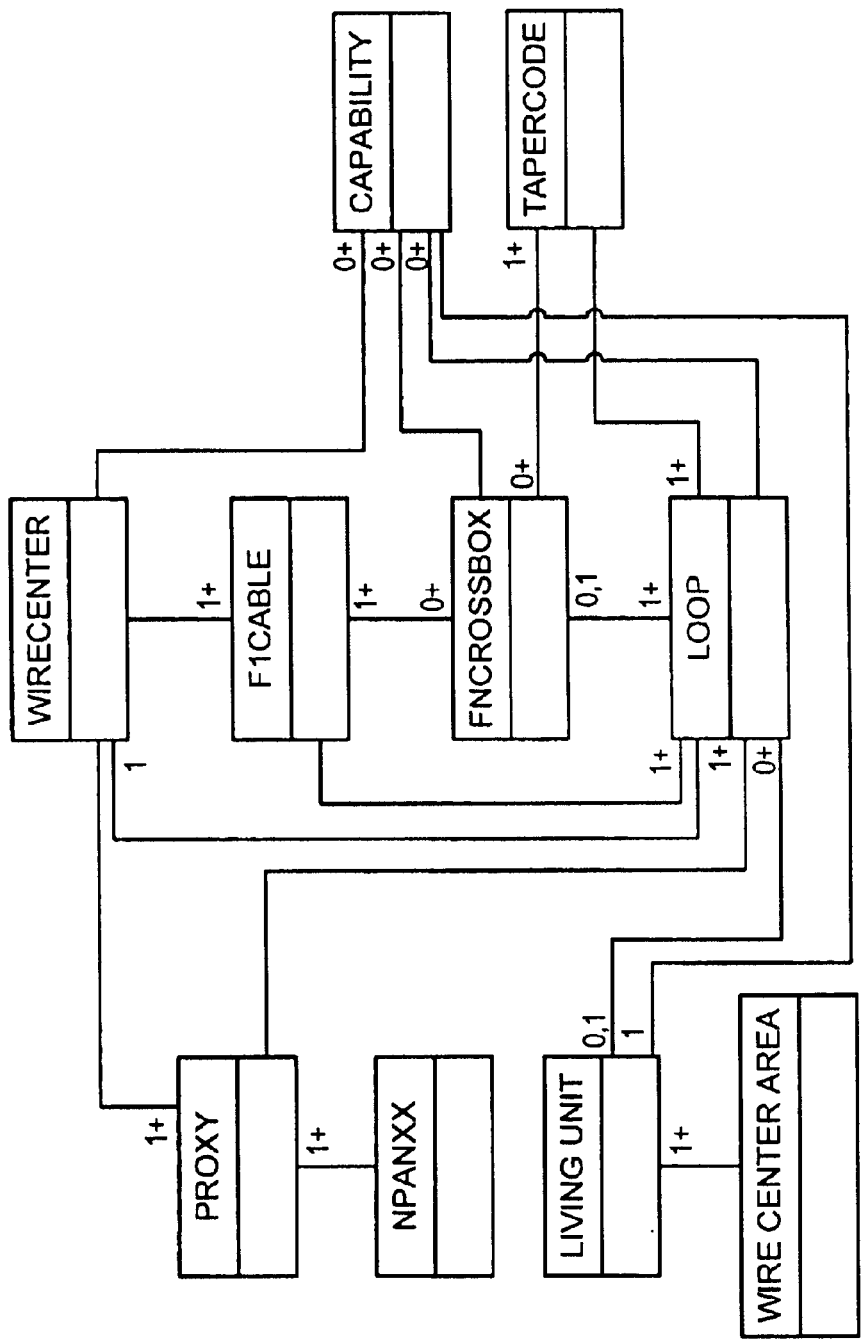
FIG. 13 is an example of a data model for the loop qualification system of FIG. 12.

The living unit, which has been mentioned above, is a new object class included in the object model. A preferred object model for the loop qualification system 120 is shown in FIG. 13. The living unit represents the subscriber's living unit and is a copy of the living unit entity in LEIS 50. A living unit is characterized by a street address having a set of street address fields by which the living unit is characterized in LEIS 50. These fields include unit, floor, building, house number, street, community, and state. The living unit is also identified by the LEU ID field.

The loop qualification system object model also includes an object class for WireCenterArea. The object class of WireCenterArea has a primary purpose of tying each living unit in the database 104 to a particular wire center's jurisdiction in a semi-permanent way. In the loop object class, the attribute of identifier, which stands for phone number may be a phone number if the loop is a working POTS line. The identifier attribute may be blank if the loop is a non-working connect-through line or either blank or circuit ID if the loop has planned or available PC-data service. The loop class includes an attribute which indicates if the loop is working, connect-through, or some other status. The loop object class also includes a loopId which is used to relay a loop object to a living unit object in the loop qualification system database 104. The capability class has a source attribute indicating the type of source from which the capability information was updated in the loop qualification system database 104.

Many organizations using or accessing the loop qualification system 120, such as the NSPs 80, need to provide an LQS interface to multiple users via a web server or some unique OS. The Loop Qualification System 120 provides "server accounts" to client organizations, but for performance reasons, has to limit the number of LQS connections or Sessions. This raises the question of how to provide many independent users with concurrent access to an LQS Session.

One approach is to have all threads in a server compete for the same Java object LqsSession that controls communications with the LQS server. In this approach, one Java Virtual Machine (VM) has n user threads, Thread 1 to Thread n. A similar architecture can apply to other types of servers, that is, Servlet could be replaced by an RMI server, DCOM server component, or CORBA server.

Each Servlet implements requests, which are discrete user actions, by invoking a qualify( ) method on the LqsSession singleton. Because web servers provide concurrent access to many users, each user is assigned a thread context. Abstractly, a thread is a serial stream of program instructions. In this example, each Servlet instance runs in an independent thread. Because LqsSession.qualify( ) is declared synchronized, qualify( ) will accept control from one thread and block all other threads that attempt to call qualify( ) simultaneously. No exceptions are thrown; one blocked thread is simply unblocked when the controlling thread exits the qualify( ) method. An effect of the single-threaded access to qualify( ) is that all requests are serialized: Request 2 must wait for Request 1 and Request 3 must wait for Request 2. Under a light load, concurrent access to the LQS system 120 can be provided. But, if many requests are outstanding, the last thread serviced could be blocked for a considerable time. Worse, if the LQS system 120 cannot be reached for some reason or an operation does not complete, all threads will remain blocked and the server at the NSP 80 may require a restart to restore functionality.

Figure 14:
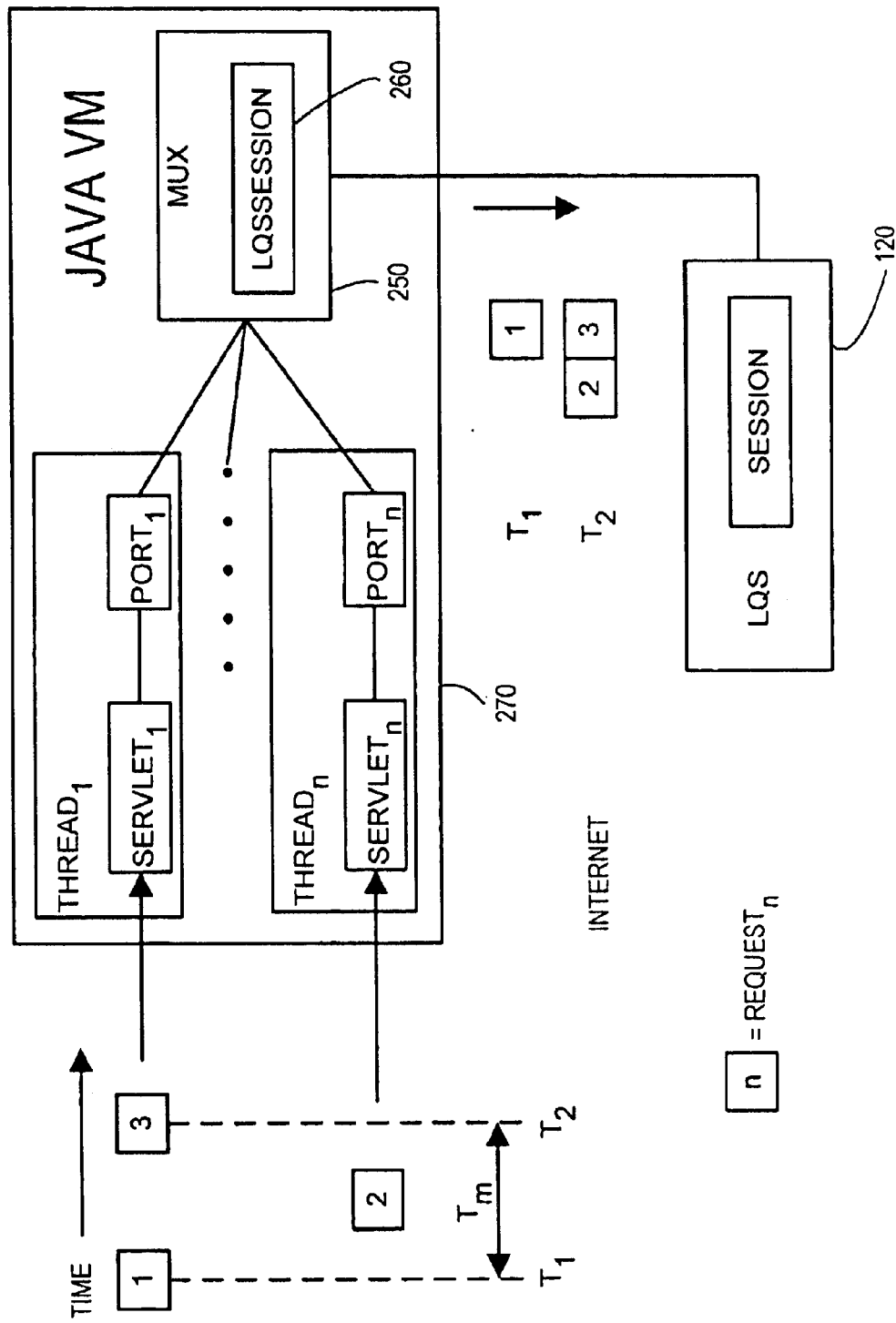
FIG. 14 is a block diagram of a multiplexor architecture for use by clients in interfacing with the loop qualification system.

FIG. 14 illustrates a client Application Program Interface (API) for the LQS system 120 which has a multi-threaded interface. The API includes a LQS Multiplexor 250, which forms part of a Java library and Java Virtual Machine (VM) 270. Each thread hosts an independent, client-implemented LQS server but each Servlet holds a distinct instance of a port rather than sharing the LqsSession 260. In general, a transmission multiplexor (MUX) 250 combines traffic from one or more multiplexor ports into a single stream. Similarly, the LqsMux is a singleton Java object that multiplexes LQS qualification requests (from port objects) onto a single LQS Session 260. Each port operates in the context of the client thread, not the MUX thread.

The MUX 250 is responsible for managing the LqsSession object 260. The LqsSession object 260 is responsible for handling authentication and recovery of the CORBA connection, as necessary. Under certain conditions, the CORBA ORB can become blocked, which will block the current LqsSession 260 operation. The MUX 250 detects such problems and recovers by instantiating a new LqsSession 260 and ORB.

When a thread invokes the qualify( ) operation on its port, the port will block until the MUX services the request. If the port is not serviced in a specified interval, a time-out exception is thrown. The default time-out interval is 20 seconds. This time-out mechanism is safe in that it is completely independent of the LqsSession 260 and associated CORBA ORB.

A port-servicing algorithm operates as follows. In a quiescent state, the MUX 250 waits for a request from a port.

As soon as a request is received, the MUX 250 sends it to the LQS system 120 and the response is returned. The MUX 250 returns the response to the port and unblocks its thread. Thus, intermittent requests are serviced immediately. As shown in FIG. 14, a Request 1 triggers a request to the LQS 120 at time t 2. Each request can have 1 to a maximum number of telephone numbers (TN)/addresses (AddressKeys), M, that can be sent in one LQS query. Thus, one query preferably does not contain any more than M TNs or AddressKeys.

An "Address Database" is made available to the NSPs 80 enabling them to translate a customer's address to an unambiguous Address Key which is then used to query LQS system 120. To take advantage of address-based qualification, the NSP 80 provides appropriate client-side processing to match a client address with the associated entry in the database. The database is available for download from the system 120, such as through a web site associated with the system 120.

The NSPs 80 match the user's address to the LQS acceptable Address-Key. The CORBA interface 122 accepts either the Address-Key or telephone numbers for Loop Qualification Inquiries. The telephone number is accepted as 10-digit number and the Address-Key is accepted as a character string that begins with "@" sign and followed by 1 to 10 alphanumeric characters, as defined in the Address Database for each address. The telephone number based loop qualification will return the ADSL capability of the line; the address-key based loop qualification will return the ADSL capability of the address.

An "AddressKey file" exists for each wire center with an example of a portion of an AddressKey file being as follows:

0000000000~WireCenter~~zchrlama~~~~~
old slaughter rd~4851~~~~zachary~3031C2E~15qt2
old slaughter rd~5463~~~~zachary~3031EA9~1up31.3
old slaughter rd~5107~~~~zachary~3031D80~1e1u2
old slaughter rd~5523~~~~zachary~3031ED0~1utt2

The format of each address line is:
<LivingUnit>::=
    <LuAddress><sep><AddressKey><sep><ignore>
<LuAddress>::=
    <StreetName><sep><StreetNumber><sep>
        <BuildingId><sep>
    FloorId><sep><UnitId><sep><CommunityId>
<sep>::='~'

To support address-based queries, the NSP 80 provides support for matching an actual customer address to a unique LuAddress in the AddressKey files. By giving the NSP 80 the raw address data, the NSP 80 has complete flexibility in how to lookup addresses. Depending upon the needs of the NSP 80, this could be as sophisticated as an interactive GUI or as simple as performing Unix "grep" commands on the files. Regardless of the technique, a unique LuAddress is found. Then, the associated AddressKey can be used to query the LQS system 120. If there is at least one ADSL-capable loop at the physical LivingUnit, the LQS system 120 returns an 'A' or 'P' response, otherwise, an 'N' with EA reason code is returned.

The MUX 250 preferably does not service ports sooner than $t_m$ milliseconds from the last time any port was serviced. As shown at $t_2$ in FIG. 14, Request 2 and Request 3 are outstanding at $t_2$ so, the telephone numbers for Request 2 and Request 3 are combined into a single CORBA query and sent to the LQS 120. When the results are returned from the LQS 120, the MUX 250 distributes them to the respective ports and the threads are unblocked. Assuming $t_m$ is 3000 ms or 3 seconds, the average thread wait under heavy load would be 1.5 seconds and the worst-case is 3 seconds. Sporadic traffic should average less than 1 second since the MUX 250 will service the request immediately.

The LQS session abstraction represents an authenticated, possibly encrypted, private connection to the LQS server 120. The connection could be implemented with CORBA and the underlying implementation may use synchronous or asynchronous communications. Further, some client applications may choose to use the LqsSession connection directly. While Java is the preferred language, the invention may be implemented with other languages.

An example of a GUI interface to a loop qualification system is shown in FIG. 15(A). Through this GUI interface, NSPs 80 or customer service representatives can input telephone numbers and receive the status of those loops. FIG. 15(A) shows the results for four different telephone numbers. The displayed status for each number is either A for available, P for planned, or N for not qualified. For qualified numbers, responses also include C for copper or F for fiber. For those numbers that are planned, the responses will also include the date when services plan to be available. For those loops that are not qualified, the response also includes a code representing the reason that the numbers are not qualified. The GUI preferably has a transcript window that enables a user to qualify telephone numbers or addresses and record them in a scrolling window. The user is also able to store the output in a log file. An example of a transcript window is shown in FIG. 15(B).

Figure 16:
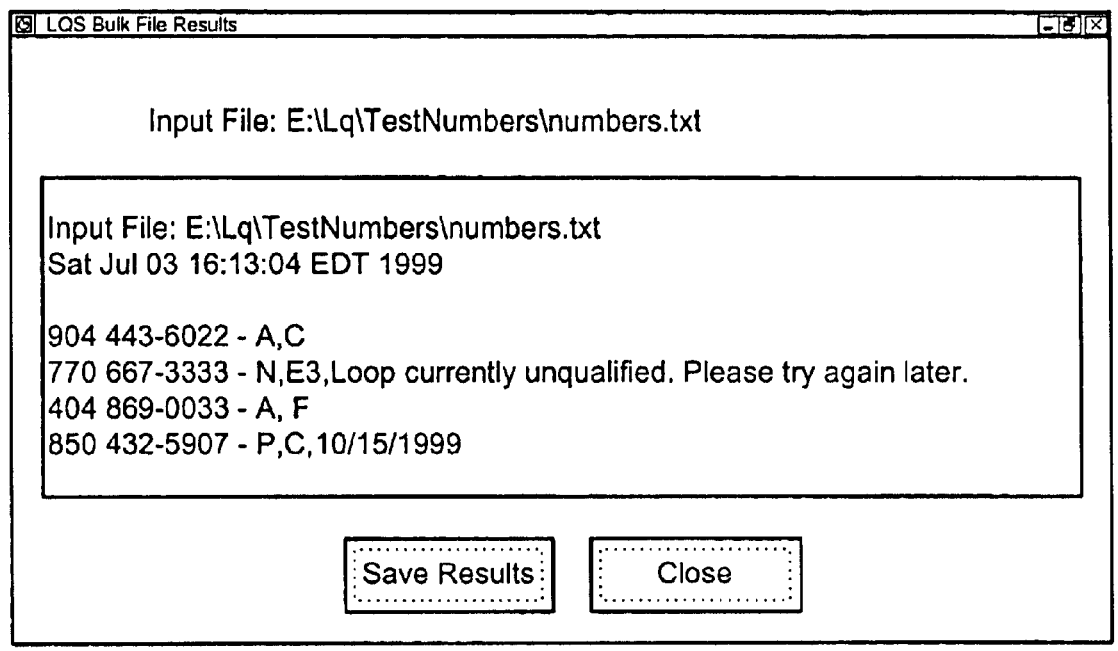
FIG. 16 is a screen shot of a client-side interface for submitting telephone numbers via bulk submit.

FIG. 16 is an example of an interface for a bulk submit. In the preferred embodiment, a request may include up to one thousand numbers submitted in a single file. The loop qualification system 120 receives this file, processes the numbers contained within the file, and generates a file with responses for each number. FIG. 16 shows the results for the same numbers used in the example of FIG. 15 but submitted through the bulk submit utility.

The loop qualification system 120 preferably also rates the speed of the line. Since different levels of DSL service are available, the loop qualification system 120 provides some indication as to the highest level of service that may be available. For instance, the loop qualification system 120 provides a service rate code of A5 when the calculated distance is 9 Kf which translates into a downstream rate of 2 to 6 Mb/s and an upstream rate of 128 Mb/s. When the loop qualification system 120 calculates the distance at 10 Kf, the line receives a service rate code of B5 meaning a downstream rate of 1.5 Mb/s and an upstream rate of 128 Kb/s. The loop qualification system 120 assigns a service rate code of C5 at a calculated distance of 11.9 Kf which means that the line is qualified for a downstream rate of 768 Kb/s and an upstream rate of 128 Kb/s. The loop qualification system 120 assigns a service rate code of D5 at a calculated distance of 12.0 Kf for a downstream rate of 384 Kb/s and an upstream rate of 384 Kb/s. When the loop qualification system 120 determines that the calculated distance is 15.0 Kf, the system 120 assigns a service rate code of E5 for a downstream and upstream rate of 192 Kb/s. The service rate codes of A5, B5, C5, D5, and E5 are targeted for business rates whereas a service rate code of L0 is for a mass-market consumer rate and is assigned when the line has a calculated distance of 18.0 Kf, the line is PC-data ready, or has a remote DSLAM. The service rate code of L0 corresponds to a downstream rate and upstream rate of the best effort, which may be 256 Kb/s.

In addition to qualifying loops, the loop qualification systems and methods of the invention provide additional advantages. The loop qualification system preferably tracks the queries and also the responses and provides data available for analysis. This data allows for the generation of reports revealing where interest lies for service, such as by taper code, wire center, address, or NSP 80. With such information, planning for new lines, upgrades, new facilities, etc. can be focused in certain areas so as to maximize a return on investment. The data that is obtained from tracking the queries and responses is preferably placed in a database that can be queried by network planners.

Furthermore, the invention may be used in combination with conventional or later developed techniques for qualifying lines. For example, the loop qualification systems according to the invention may be used to obtain an initial status of lines. In addition to relying upon the loop qualification systems, the invention may employ testing to audit and purify the database. This testing may be performed at the central office or may be performed at least partially at the customer's premises.

The foregoing description of the preferred embodiments of the invention has been presented only for the purpose of illustration and description and is not intended to be exhaustive or to limit the invention to the precise forms disclosed. Many modifications and variations are possible in light of the above teaching.

For example, the invention is not limited to the precise types of interfaces described in the exemplary systems, such as a CORBA interface. The invention can be implemented with web interfaces, XML interface, and other interfaces apparent to those skilled in the art upon reading this description.

The embodiments were chosen and described in order to explain the principles of the invention and their practical application so as to enable others skilled in the art to utilize the invention and various embodiments and with various modifications as are suited to the particular use contemplated.

What is claimed is:

1. A method for qualifying lines for digital services from loop record data without resorting to any testing of the lines, comprising:
   collecting the loop record data on the characteristics of the lines from at least one source;
   the loop record data comprising loop make-up data derived without any testing of the lines;
   storing the loop record data on the characteristics of the lines;
   receiving a request inquiring as to a status of a line for digital services;
   determining the status of a line for digital services by evaluating the data on the characteristics of the lines; and
   replying to the request with the status of the line for digital services;
   wherein determining the status of the line comprises evaluating a status of a wire center for the line.

2. A method for qualifying lines for digital services from loop record data without resorting to any testing of the lines, comprising:
   collecting the loop record data on the characteristics of the lines from at least one source;
   the loop record data comprising loop make-up data derived without any testing of the lines;
   storing the loop record data on the characteristics of the lines;
   receiving a request inquiring as to a status of a line for digital services;
   determining the status of a line for digital services by evaluating the loop record data on the characteristics of the lines; and
   replying to the request with the status of the line for digital services;
   wherein determining the status of the line comprises evaluating a status of a taper code for the line.

3. A method for qualifying lines for digital services, comprising:
   collecting data on the characteristics of the lines from at least one source;
   storing the data on the characteristics of the lines;
   receiving a request inquiry as to a status of a line for digital services;
   determining the status of a line for digital services by evaluating the data on the characteristics of the lines; and
   replying to the request with the status of the line for digits services;
   wherein determining the status of the line comprises evaluating a resist zone for the line.

4. A method for qualifying lines for digital services, comprising:
   collecting data on the characteristics of the liens from at least one source;
   storing the data on the characteristics of the lines;
   receiving a request inquiring as to a status of a line for digital services;
   determining the status of a line for digital services by evaluating the data on the characteristics of the lines; and
   replying to the request with the status of the line for digital services;
   wherein determining the status of the line comprises evaluating a carrier zone for the line.

5. A system for qualifying lines for digital services from loop record data without resorting to any testing of the lines, comprising:
   a database containing the loop record data on the characteristics of the lines, the loop data derived without any testing of the lines;
   an interface for receiving requests on the status of certain lines; and
   a server for processing the requests by evaluating the loop record data on the lines and for determining a status of the lines;
   wherein the server generates responses to the request with the responses indicating the status of the lines;
   wherein the database includes loop record data on wire centers and the server determines the status of the line by evaluating the loop record data on the wire centers.

6. A system for qualifying lines for digital service from loop record data without resorting to any testing of the lines, comprising:
   a dataset containing the loop record data on the characteristics of the lines, the loop data derived without any testing of the lines;
   an interface for receiving requests on the status of certain lines; and
   a server for processing the requests by evaluating the loop record data on the lines and for determining a status of the lines;

wherein the server generates responses to the requests with the responses indicating the status of the lines;

wherein the database includes the loop record data on taper codes and the server determines the status of the lines by evaluating the loop record data on the taper codes.

7. A system for qualifying lines for digital service comprising:

a database containing data on the characteristics of the lines;

an interface for receiving requests on the status of certain lines; and a server for processing the requests by evaluating the data on the lines and for determining a status of the lines;

wherein the server generates responses to the requests with the responses indicating the status of the lines;

wherein the database includes data on the resist zone and the server determines the status of the lines by evaluating the data on the resist zone.

8. A system for qualifying lines for digital service, comprising:

a database containing data on the characteristics of the lines;

an interface for receiving requests on the status of certain lines; and a server for processing the requests by evaluating the data on the lines and for determining a status of the lines;

wherein the server generates responses to the requests with the responses indicating the status of the lines;

wherein the database includes data on the carrier zone and the server determines the status of the lines by evaluating the data on the carrier zone.

* * * * *